(12) United States Patent
Shahidi et al.

(10) Patent No.: US 12,475,654 B2
(45) Date of Patent: Nov. 18, 2025

(54) SITUATIONAL AWARENESS HEADSET

(71) Applicant: THE BOEING COMPANY, Chicago, IL (US)

(72) Inventors: Payam Shahidi, Mission Viejo, CA (US); John F. Bremer, Bellingham, WA (US); James Edward Hougardy, II, Tukwila, WA (US); Michael Van Holland, Bonaire, GA (US); Jorjik Pourghassamians, Huntington Beach, CA (US); James Yang, ThousandOaks, CA (US); Aaron Chen, Long Beach, CA (US); Jeffrey L. Klepper, Warner Robins, GA (US)

(73) Assignee: THE BOEING COMPANY, Arlington, VA (US)

( * ) Notice: Subject to any disclaimer, the term of this patent is extended or adjusted under 35 U.S.C. 154(b) by 215 days.

(21) Appl. No.: 17/650,001

(22) Filed: Feb. 4, 2022

(65) Prior Publication Data
US 2023/0252730 A1   Aug. 10, 2023

(51) Int. Cl.
*G06T 19/00* (2011.01)
*G06T 7/70* (2017.01)
*H04N 13/366* (2018.01)

(52) U.S. Cl.
CPC ............ *G06T 19/006* (2013.01); *G06T 7/70* (2017.01); *H04N 13/366* (2018.05)

(58) Field of Classification Search
CPC .. G06F 3/011; G06F 3/04817; G06F 3/04842; G06F 1/00; G06V 20/20; G06T 19/006; G06T 7/70; H04N 13/366
See application file for complete search history.

(56) References Cited

U.S. PATENT DOCUMENTS 8,615,383 B2 * 12/2013 Dobbins ............... G06F 3/011
                                                      703/1
9,848,066 B2    12/2017 Kumano
(Continued)

FOREIGN PATENT DOCUMENTS

CN    116560494 A  *  8/2023    .............. G06F 3/011
JP   2002287846 A  *  10/2002
(Continued)

OTHER PUBLICATIONS

Extended European Search Report for Application No. 22214857.9 dated Jun. 5, 2023, pp. 1-11.
(Continued)

*Primary Examiner* — Chante E Harrison
(74) *Attorney, Agent, or Firm* — Moore IP Law

(57) ABSTRACT

A method includes calibrating, at a headset, a position of a headset user in a physical environment based on one or more virtual position indicators designated by the headset user in image data captured by one or more cameras of the headset. The method includes generating a visual representation of the physical environment based at least in part on the position. The visual representation schematically represents one or more structures of the physical environment and includes an avatar positioned in the visual representation to represent a location of a second headset user. The method includes displaying the visual representation of the physical environment at one or more display screens of the headset. The method also includes initiating a communication with the second headset user in response to a detection that the headset user selected the avatar from the visual representation displayed via the one or more display screens.

20 Claims, 7 Drawing Sheets

(56) References Cited

U.S. PATENT DOCUMENTS

| | | | |
|---|---|---|---|
| 11,104,454 B2 | 8/2021 | Hoover et al. | |
| 2019/0308109 A1* | 10/2019 | Sullivan | A63F 13/87 |
| 2019/0313059 A1* | 10/2019 | Agarawala | G06T 19/006 |
| 2020/0209957 A1* | 7/2020 | Sztuk | H04N 7/157 |
| 2021/0084259 A1* | 3/2021 | Kies | A63F 13/655 |
| 2021/0312684 A1* | 10/2021 | Zimmermann | G02B 27/01 |
| 2022/0317830 A1* | 10/2022 | Skuratowicz | G06F 3/0482 |
| 2023/0100610 A1* | 3/2023 | Pastrana Vicente | G06F 3/017 |
| | | | 715/727 |
| 2023/0214007 A1* | 7/2023 | Dabush | G06F 3/011 |
| | | | 345/156 |

FOREIGN PATENT DOCUMENTS

| | | | | |
|---|---|---|---|---|
| JP | 2020135531 A | * | 8/2020 | |
| JP | 2021194293 A | | 12/2021 | |
| JP | 2023154816 A | * | 10/2023 | |
| KR | 102081712 B1 | * | 5/2020 | |
| KR | 102212336 B1 | * | 2/2021 | |
| KR | 20230122750 A | * | 8/2023 | |
| WO | WO-2019199569 A1 | * | 10/2019 | G06F 3/011 |
| WO | 2021011305 A1 | | 1/2021 | |

OTHER PUBLICATIONS

Communication pursuant to Article 94(3) EPC for application No. 22214857.9 dated Jun. 20, 2025 pp. 1-9.

* cited by examiner

SITUATIONAL AWARENESS HEADSET

FIELD OF THE DISCLOSURE

The subject disclosure is generally related to a situational awareness headset.

BACKGROUND

To ensure that an aircraft is functioning properly, maintenance crews can perform routine checks and maintenance on the aircraft. Typically, at any given time, maintenance crew members can be located at different areas of the aircraft to perform various tasks and checks. As a non-limiting example, at a specific point in time, a first maintenance crew member can be near the cockpit of the aircraft, a second maintenance crew member can be near the engine of the aircraft, and a third maintenance crew member can be near the rear of the aircraft. If the first maintenance crew member determines that it is necessary to turn on the engine from the cockpit to perform an assigned task, to ensure the safety of other maintenance crew members, the first maintenance crew member needs to be aware (e.g., have situational awareness) of the locations of the other maintenance crew members. For example, if the first maintenance crew member turns on the engine while the second maintenance crew member is performing maintenance near the engine, the safety of the second maintenance crew member could be jeopardized.

Additionally, in some scenarios, the maintenance crew members may need help from experts (e.g., subject matter experts) to complete the routine checks and maintenance on the aircraft. If there is a shortage of experts, or if an expert is not readily available at the site of the aircraft, maintenance can be substantially delayed.

SUMMARY

In a particular implementation, a headset includes communication circuitry, one or more cameras, one or more display screens, and one or more processors coupled to the communication circuitry. The one or more processors are configured to calibrate the position of a headset user in a physical environment based on one or more virtual position indicators designated by the headset user in image data captured by the one or more cameras. The one or more processors are also configured to generate a visual representation of the physical environment based at least in part on the position. The visual representation schematically represents one or more structures of the physical environment and includes an avatar positioned in the visual representation to represent a location of a second headset user. The one or more processors are further configured to display the visual representation of the physical environment at the one or more display screens. The one or more processors are also configured to initiate communication, via the communication circuitry, with the second headset user in response to a detection that the headset user selected the avatar via the visual representation.

In another particular implementation, a method includes calibrating, at or leveraging one or more processors of a headset, a position of a headset user in a physical environment based on one or more virtual position indicators designated by the headset user in image data captured by one or more cameras of the headset. The method also includes generating a visual representation of the physical environment based at least in part on the position. The visual representation schematically represents one or more structures of the physical environment and includes an avatar positioned in the visual representation to represent a location of a second headset user. The method further includes displaying the visual representation of the physical environment at one or more display screens of the headset. The method also includes initiating communication with the second headset user in response to a detection that the headset user selected the avatar from the visual representation displayed via the one or more display screens. The avatar is selected using a virtual pointer.

In another particular implementation, a non-transitory computer-readable medium instructions, when executed by one or more processors of a headset, cause the one or more processors to calibrate a position of a headset user in a physical environment based on one or more virtual position indicators designated by the headset user in image data captured by one or more cameras. The instructions, when executed by the one or more processors, further cause the one or more processors to generate a visual representation of the physical environment based at least in part on the position. The visual representation schematically represents one or more structures of the physical environment and includes an avatar positioned in the visual representation to represent a location of a second headset user. The instructions, when executed by the one or more processors, also cause the one or more processors to display the visual representation of the physical environment at one or more display screens. The instructions, when executed by the one or more processors, further cause the one or more processors to initiate communication, via communication circuitry, with the second headset user in response to a detection that the headset user selected the avatar via the visual representation.

The features, functions, and advantages described herein can be achieved independently in various implementations or can be combined in yet other implementations, further details of which can be found with reference to the following descriptions and drawings.

DETAILED DESCRIPTION

Figure 1:
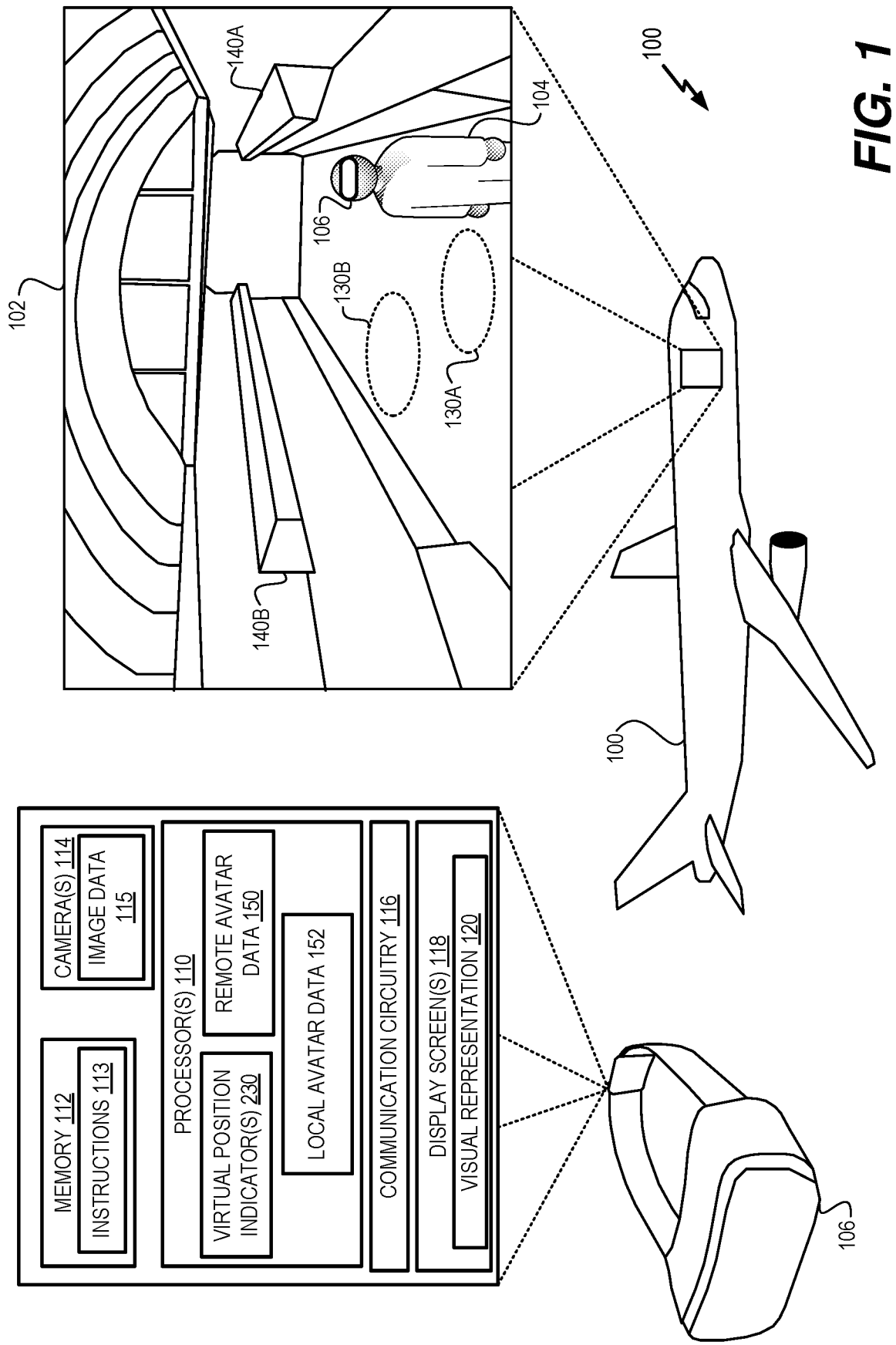
FIG. 1 is a diagram that illustrates an example of a headset configured to provide a headset user with situational awareness for a surrounding environment.

Aspects disclosed herein present example systems and methods for providing a headset user with situational awareness of a surrounding environment. As used herein, "situational awareness" can include information associated with other headset users in the surrounding environment (such as the location of other headset users), information associated with a location, operation, or other aspects of the surrounding environment, or both. The headset user can wear an augmented-reality headset (herein referred to as a "headset") in a particular environment, such as an aircraft. Cameras integrated into the headset can be used to capture real-time images of the aircraft, and the real-time images are used to generate a visual representation of the aircraft. According to one implementation, the visual representation corresponds to a three-dimensional (3D), augmented-reality representation of the aircraft that is displayed at a display screen of the headset. For example, based on the captured real-time images, a processor of the headset can generate (e.g., create) an augmented-reality representation of the aircraft.

According to another implementation, the processor can generate a two-dimensional (2D) representation (e.g., a schematic) of the aircraft and display the 2D representation at the display screen. To generate the 2D representation, the headset can access schematic data (or other plans) that describe the layout of the aircraft. The processor can have access to the schematic of the aircraft. For example, if the aircraft is one of a standard model, the processor can access a layout of the aircraft and use the layout to generate the 2D visual representation.

As described below, the position of the headset user and the position of other headset users in the aircraft can be integrated into the visual representation to provide situational awareness to the headset user. However, prior to integrating the positions into the visual representation, the processor of the headset can use user-defined world anchors to calibrate the position of the headset user within the aircraft. To illustrate, to calibrate a physical position of the headset user in the aircraft such that the headset user can view their position in the 2D visual representation, the headset user can designate one or more virtual position indicators in the captured real-time images. For example, while the headset user is at a first position in the aircraft, the headset user can designate a first virtual position indicator in the visual representation. The first virtual position indicator can correspond to a world anchor that indicates to the headset that the headset user is at the first position (e.g., a real-world position). For example, if the first position corresponds to a pilot seat, the headset user can indicate that the first virtual position indicator is located at the pilot seat. After designating the first virtual position indicator, the headset user can move to a second position in the aircraft. The processor can use one or more sensors to track movements of the headset user between the first position and the second position. For example, the processor can track the change in distance between the first position and the second position, the change in altitude between the first position and the second position, a direction between the first position and the second position, etc. Once the headset user is in the second position, the headset user can designate a second virtual position indicator in the visual representation. Based on the first virtual position indicator, the tracked movements, and the second virtual position indicator, the processor within the headset can calibrate the physical position of the headset user in the aircraft. Thus, the headset user's position can be calibrated based on world anchors set by the headset user, as opposed to scanning markers (e.g., QR codes) at predetermined locations in the aircraft.

After the position of the headset user is calibrated, situational awareness data associated with other headset users can be integrated into the visual representation. For example, the headset can receive positional data indicating the position of the other headset users within the aircraft. Based on the positional data, avatars indicating the position of the other headset users can be inserted into the visual representation. Thus, in the scenario where the visual representation is a 2D layout of the aircraft, the headset user can readily identify where other headset users are located within the aircraft by looking at avatars in the visual representation. Additionally, the headset user can select a particular avatar in the visual representation to initiate a communication (e.g., a headset-to-headset call) with the corresponding headset user. Thus, if a maintenance crew member is wearing the headset, the maintenance crew member can identify the location of other maintenance crew members in the aircraft and can communicate with those crew members (via the headset) to ensure that proper safety precautions are undertaken during maintenance. For example, if the maintenance crew member is about to turn on the engine and identifies, via the visual representation, that a particular crew member is proximate to the engine, the maintenance crew member can select an avatar in the visual representation that is associated with the particular crew member to communicate with that particular crew member to move to a safe place.

Additionally, in the scenario where the visual representation is a 3D augmented-reality representation of the aircraft, the techniques described herein enable a remote headset user to transpose a virtual representation of themselves into the visual representation of the headset user. For example, a remote headset user in a different aircraft with similar (or identical) specifications can calibrate their position in the different aircraft in a similar manner as the headset user calibrates their position in the aircraft. After calibration, the remote headset user can send positional data to the headset of the headset user such that a virtual representation of the remote headset user is transposed into the visual representation of the headset user. As a result, the headset user can view a 3D avatar of the remote headset user in the visual representation as if the remote headset user is on the same aircraft as the headset user. Thus, if a maintenance crew member is wearing the headset, a virtual representation of a remote subject matter expert can be transposed into the 3D visual representation of the maintenance crew member's headset to assist the maintenance crew member.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, multiple virtual position indicators are illustrated and associated with reference numbers 230A and 230B. When referring to a particular one of these virtual position indicators, such as the virtual position indicator 230A, the distinguishing letter "A" is used. However, when referring to any arbitrary one of these virtual position indicators or to these virtual position indicators as a group, the reference number 230 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a headset 106 with one or more processors ("processor(s)" 110 in FIG. 1), which indicates that in some implementations the headset 106 includes a single processor 110 and in other implementations the headset 106 includes multiple processors 110. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a headset 106 that is configured to provide a headset user with situational awareness for a surrounding environment. For example, according to the example of FIG. 1, the headset 106 is configured to provide a headset user 104 with situational awareness for an aircraft 100. As used herein, "situational awareness" can include information associated with other headset users in the surrounding environment. As a non-limiting example, situational awareness can include information indicating the position of other headset users. According to one implementation, the headset user 104 can be a maintenance crew member that is performing routine checks on the aircraft 100 or performing maintenance on the aircraft 100. However, it should be understood that the headset user 104 can be any individual that is wearing the headset 106.

In FIG. 1, the headset user 104 is depicted in a physical environment 102. For example, in FIG. 1, the physical environment 102 corresponds to the aircraft 100 or a section of the aircraft 100. According to one implementation, the physical environment 102 can include a loading area of the aircraft 100. According to another implementation, the physical environment 102 can include a cabin of the aircraft 100. According to yet another implementation, the physical environment 102 can include another part of the aircraft 100. It should be understood that the aircraft 100 (or a section of the aircraft 100) is merely an example of the physical environment 102 and that the techniques described herein can be implemented in non-aircraft environments. As non-limiting examples, the physical environment 102 can include a building, a boat, other types of motor vehicles, other types of environments, etc.

The physical environment 102 includes one or more structures 140. For example, in the example of FIG. 1, the physical environment 102 includes a structure 140A on the wall of the aircraft 100 and another structure 140B on the wall of the aircraft 100. It should be understood that the structures 140 illustrated in FIG. 1 are merely for illustrative purposes and the aircraft 100 can include additional structures.

The headset 106 worn by the headset user 104 includes one or more processors 110, a memory 112 coupled to the one or more processors 110, one or more cameras 114 coupled to the one or more processors 110, communication circuitry 116 coupled to the one or more processors 110, and one or more display screens 118 coupled to the one or more processors 110. The memory 112 can correspond to a non-transitory computer-readable storage medium that stores instructions 113. The instructions 113 are executable by the processor 110 to perform the operations described herein. The communication circuitry 116 can include one or more wireless transceivers, receivers, transmitters, antennas, radios, etc. that are used to communicate (e.g., call) other headsets.

The cameras 114 of the headset 106 are configured to capture image data 115 of the physical environment 102. According to one implementation, the cameras 114 can be located at different positions of the headset 106 and can have different orientations such that the image data 115 captured by the cameras 114 reflect the surroundings of the headset user 104. The image data 115 is provided to the processor 110, and the processor 110 is configured to generate a visual representation 120 of the physical environment 102 based on the captured image data 115. For example, the processor 110 can use the captured image data 115 to generate a 3D augmented-reality representation (e.g., the visual representation 120A of FIG. 2A) of the physical environment 102. The processor 110 can be configured to display the visual representation 120 of the physical environment 102 at the display screen 118. As a result, when the headset user 104 looks at the display screen 118, the headset user 104 can view the visual representation 120 of the physical environment 102 generated by the processor 110.

Figure 2A:
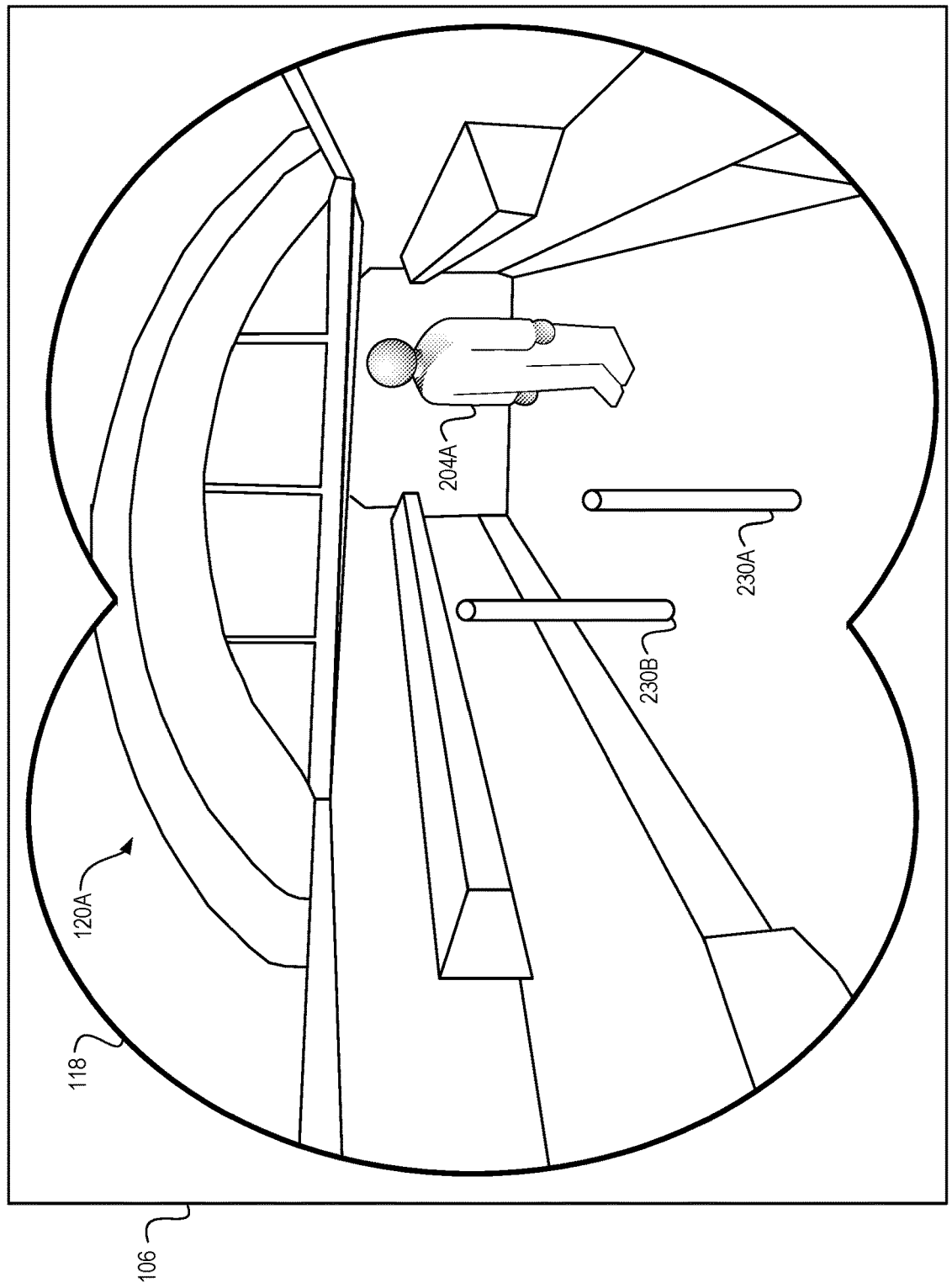
FIG. 2A depicts a three-dimensional visual representation of a physical environment that is displayed on a display screen of a headset.

Referring to FIG. 2A, a first non-limiting example of the visual representation 120A displayed at the display screen 118 is illustrated. In FIG. 2A, the visual representation 120A corresponds to a 3D augmented-reality representation of the physical environment 102. The visual representation 120A of the physical environment 102 depicted in FIG. 2A reflects what the headset user 104 views when the headset user 104 looks at the display screen 118 of the headset 106 in the physical environment 102. It should be understood that what the headset user 104 is viewing in FIG. 2A are processed images (e.g., real-time video, which may include representations of virtual objects or other data, such as text overlays) of the physical environment 102 depicted in FIG. 1. As described below, the techniques described herein enable a virtual avatar 204A (indicative of a remote headset user) to be transposed in the visual representation 120A.

Figure 2B:
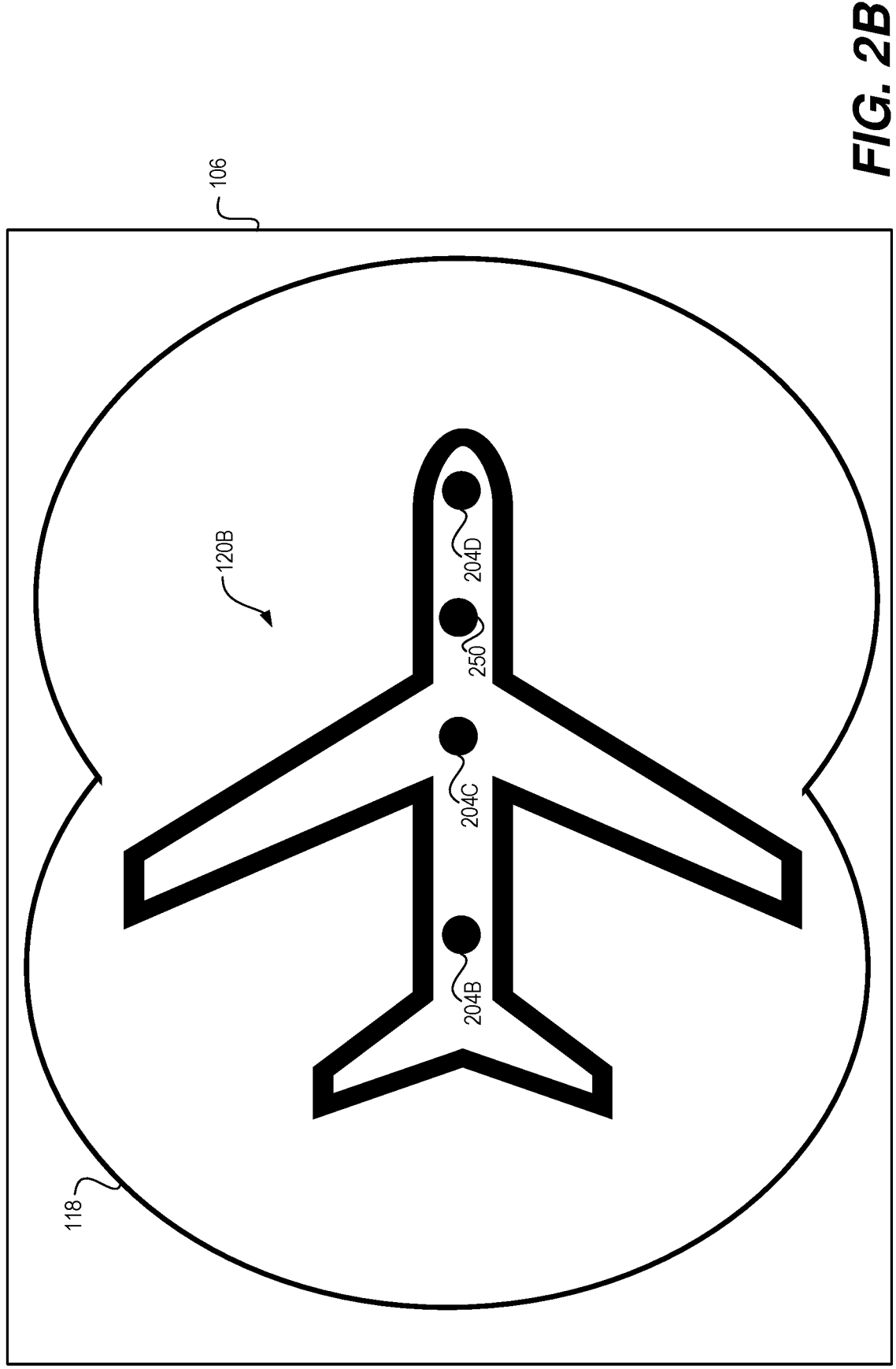
FIG. 2B depicts a two-dimensional visual representation of a physical environment that is displayed on a display screen of a headset.

Referring to FIG. 2B, a second non-limiting example of the visual representation 120B displayed at the display screen 118 is illustrated. In FIG. 2B, the visual representation 120B corresponds to a 2D representation of the physical environment 102. For example, the visual representation 120B corresponds to a structural layout or map of the aircraft 100. As described below, the techniques described herein enable virtual avatars 204B-204D (indicative of other headset users on the aircraft 100) to be inserted into the visual representation 120B to enable the headset user 104 to identify the locations of other headset users.

According to one implementation, the headset user 104 can select whether the visual representation 120A is displayed at the display screen 118 or whether the visual representation 120B is displayed at the display screen 118. For example, if the headset user 104 seeks maintenance assistance from a remote subject matter expert, the headset user 104 can select to display the visual representation 120A so that an avatar of the remote subject matter expert is visible to the headset user 104. However, if the headset user 104 seeks to identify the locations of other members of the maintenance crew on the aircraft 100, the headset user 104 can select to display the visual representation 120B. According to another implementation, the headset user 104 can select to display the visual representation 120A in conjunction with the visual representation 120B. For example, the visual representation 120B can be displayed in the corner of the display screen 118 while the visual representation 120A is displayed throughout the display screen 118. Below, the visual representations 120A, 120B depicted in FIGS. 2A and 2B are described in conjunction with the operations of the headset 106 in FIG. 1.

Referring back to FIG. 1, the processor 110 of the headset 106 is configured to calibrate a position of the headset user 104 in the physical environment 102. After the position of the headset user 104 is calibrated, the processor 110 can insert avatars indicative of the position of other headset users into the visual representation 120B, assuming that the other headset users have calibrated their position in the aircraft, so that the headset user 104 can also view the position of other headset users in the aircraft 100. As illustrated in FIG. 2A, the headset user 104 can also view the position of a remote headset user that transposes their position in a remote aircraft into the aircraft 100, as illustrated in FIG. 2A, assuming that the remote headset user has calibrated his or her position in the remote aircraft.

To calibrate the position of the headset user 104 in the physical environment 102, the headset user 104 can designate one or more virtual position indicators 230 in the visual representation 120A displayed at the display screen 118. To illustrate, the headset user 104 can move to an arbitrary position 130A in the physical environment 102 and designate a virtual position indicator 230A in the visual representation 120A. For example, referring to FIG. 2A, the virtual position indicator 230A designated, by the headset user 104, in the visual representation 120A of the physical environment 102 indicates a world anchor that indicates to the processor 110 that the headset user 104 is at the position 130A. Additional detail with respect to designating the virtual position indicator 230A is described with respect to FIG. 3. It should be understood that position 130A is selected by the headset user 104 and can correspond to any arbitrary position in the physical environment 102, as opposed to a predetermined position where a marker (e.g., a QR code) is set for scanning in order to determine the location of the headset user 104. For example, if the position 130A corresponds to a pilot seat, the headset user 104 can indicate that the virtual position indicator 230A is located at the pilot seat.

After the processor 110 receives the virtual position indicator 230A designated by the headset user 104, the headset user 104 can move to another arbitrary position 130B in the physical environment 102. The processor 110 can use one or more sensors (not shown) to track movements of the headset user 104 between the first position 130A and the second position 130B. For example, the processor 110 can track the change in distance between the position 130A and the position 130B, the change in altitude between the position 130A and the position 130B, a direction between the position 130A and the position 130B, etc. Once the headset user 104 is in the position 130B, the headset user 104 can designate a virtual position indicator 230B in the visual representation 120A. Based on the virtual position indicator 230A, the tracked movements, and the virtual position indicator 230B, the processor 110 can calibrate the position and movements of the headset user 104 in the physical environment 102. In particular, by using two world anchors and a schematic of the aircraft 100, the processor 110 can scale the movements of the headset user 104 to accurately reflect the position of the headset user 104 as the headset user 104 moves throughout the aircraft 100. As such, the processor 110 can generate an avatar 250 showing the position of the headset user 104 at any given time with respect to the aircraft 100 and display the avatar 250 in the visual representation 120B of FIG. 2B. Thus, the headset user 104 can track their position in the aircraft 100 by viewing the visual representation 120B.

After the position of the headset user 104 is calibrated, the processor 110 can generate and display avatars of other headset users. For example, according to one implementation, the techniques described herein enable the virtual avatar 204A, indicative of a remote headset user, to be transposed into the visual representation 120A of FIG. 2A. To illustrate, the position of a remote headset user can be calibrated with respect to a remote aircraft in a similar manner as the position of the headset user 104 is calibrated with respect to the aircraft 100. For example, in one scenario, the remote headset user can be located in a remote aircraft that has a similar (or identical) layout as the aircraft 100. In this scenario, the remote headset user can calibrate his or her position in the remote aircraft using world anchors in a similar manner as the headset user 104 calibrates his or her position in the aircraft 100. The remote headset user can then send remote avatar data 150 to the headset 106. The remote avatar data 150 can indicate a real-time position and real-time movements of the remote headset user in the remote aircraft. Because the remote aircraft has a similar layout as the aircraft 100, the position and movements of the remote headset user in the remote aircraft can be translated to the aircraft 100. The processor 110 can use the remote avatar data 150 to generate the avatar 204A of the remote user in the visual representation 120A of the physical environment 102, as illustrated in FIG. 2A.

Thus, the remote headset user can send positional data (e.g., the remote avatar data 150) to the headset 106 of the headset user 104 such that the avatar 204A (e.g., the virtual representation of the remote headset user) is transposed into the visual representation 120A. As a result, the headset user 104 can view a 3D avatar 204A of the remote headset user in the visual representation 120A as if the remote headset user is on the same aircraft 100 as the headset user 104. If a maintenance crew member is wearing the headset 106, a virtual representation of a remote subject matter expert can be transposed into a headset view of the maintenance crew member to assist the maintenance crew member with maintenance operations. Additionally, the headset user 104 can communicate with the remote headset user via the communication circuitry 116. For example, by selecting the 3D avatar 204A of the remote headset user, the headset user 104 can initiate a call with the remote headset user.

According to one implementation, the techniques described herein enable the headset user 104 to identify the location of other headset users on the aircraft 100 and communicate with the other headset users. To illustrate, the position of other headset users can be calibrated with respect to aircraft 100 in a similar manner as the position of the headset user 104 is calibrated with respect to the aircraft 100. The other headset users can then send local avatar data 152 to the headset 106. The local avatar data 152 can indicate a real-time position and real-time movements of the other headset users in the aircraft 100. The processor 110 can use the local avatar data 152 to generate the avatars 204B, 204C, 204D of the other headset users in the visual representation 120B, as illustrated in FIG. 2B.

According to one implementation, the headset user 104 can select a particular avatar 204 from the visual representation 120B to initiate a communication with the corresponding headset user. For example, by selecting a particular avatar 204 in the visual representation 120B, the headset user 104 can initiate a call with the associated headset user. Thus, if a maintenance crew member is wearing the headset 106, the maintenance crew member can identify the location of other maintenance crew members in the aircraft 100 (via the location of the avatars 204) and can communicate with those crew members (via the headset 106) to ensure that proper safety precautions are undertaken during maintenance.

In some scenarios, the position of other headset users can be displayed without calibrating the position of the headset user 104. For example, the processor 110 can receive the local avatar data 152 to generate the visual representation 120B without calibrating the position of the headset user 104. In these scenarios, the headset 106 would be able to track positions of the other headset users relative to the surrounding environment, but would not be able to track the position of the other headset users with respect to the position of the headset user 104 because the position (e.g., frame of reference) of the headset user 104 has not been calibrated.

The techniques described with respect to FIGS. 1-2B enable information associated with other headset users to be integrated into visual representations 120 displayed at the headset 106 of the headset user 104. For example, avatars 204B-204D indicating the location of other headset users in the aircraft 100 can be integrated into the visual representation 120B displayed at the display screen 118. Additionally, the headset user 104 can select a particular avatar 204 to call the corresponding headset user. Additionally, the techniques described herein enable remote headset users to transpose a virtual avatar 204A into the visual representation 120A displayed at the display screen 118 such that it looks as if the remote headset user is in the same physical environment 102 as the headset user 104.

Figure 3:
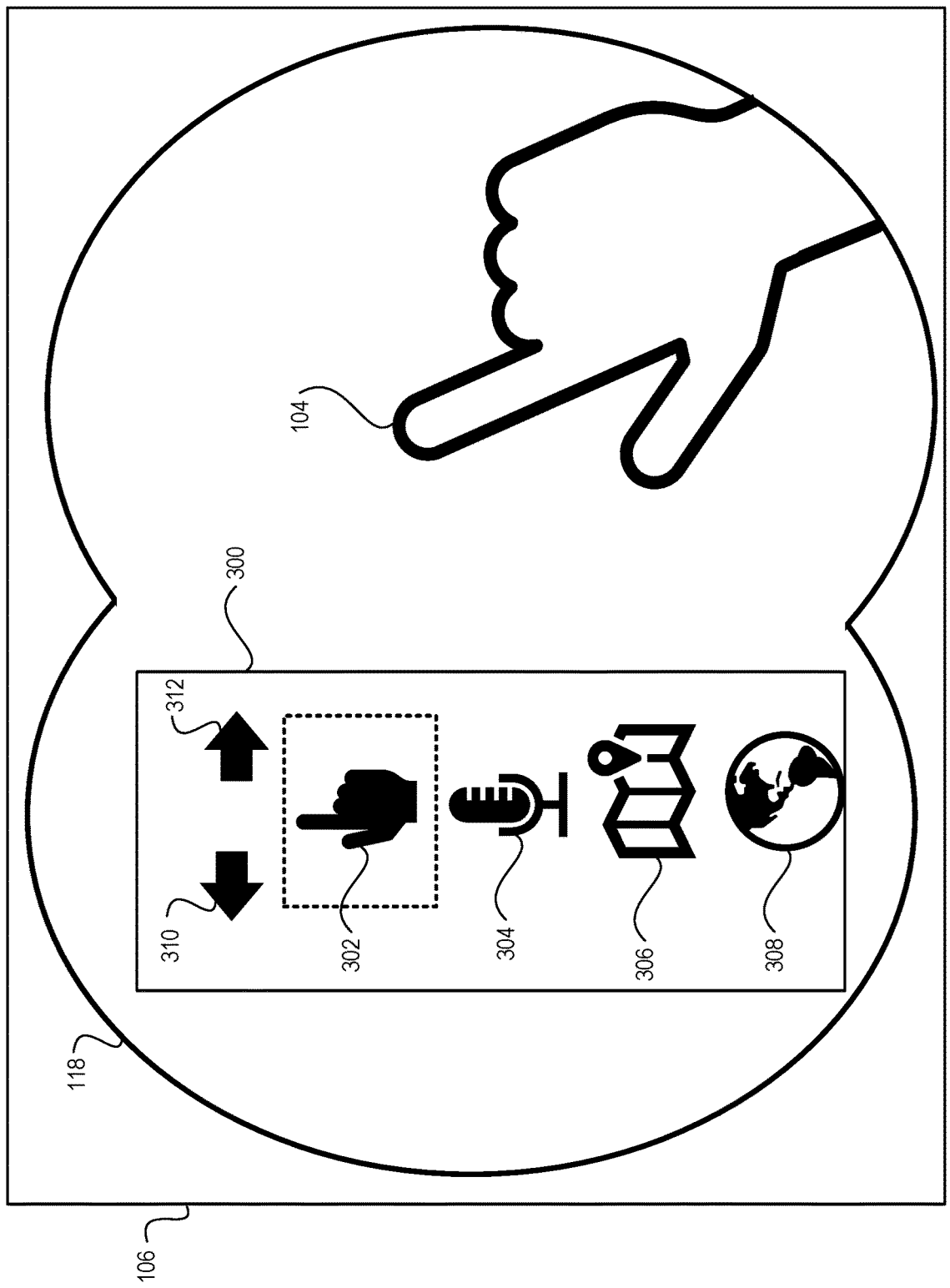
FIG. 3 depicts an example of an interface for designating a virtual position indicator and selecting a visual representation to be viewed through a display screen.

FIG. 3 depicts an example of an interface 300 for designating a virtual position indicator and selecting a visual representation to be viewed through the display screen 118. For example, the interface 300 can be a virtual interface that the headset user 104 can view through the display screen 118 of the headset 106.

The interface 300 includes two options 302, 304 for designating the virtual position indicators 230A, 230B. A first option 302 enables the headset user 104 to designate the virtual position indicators 230A, 230B by hand. For example, if the headset user 104 selects the first option 302, the headset user 104 can walk to the position 130A in the physical environment 102. After the headset user 104 is in the position 130A, the headset user 104 can select a left arrow 310 to designate the virtual position indicator 230A. Thus, in this scenario, the virtual position indicator 230A is designated as a left anchor for calibrating the position of the headset user 104. After designating the virtual position indicator 230A, the headset user 104 can walk to the position 130B in the physical environment 102. After the headset user 104 is in the position 130B, the headset user 104 can select a right arrow 312 to designate the virtual position indicator 230B. Thus, in this scenario, the virtual position indicator 230B is designated as a right anchor for calibrating the position of the headset user 104.

A second option 304 enables the headset user 104 to designate the virtual position indicators 230A, 230B by a voice command. For example, if the headset user 104 selects the second option 304, the headset user 104 can walk to the position 130A in the physical environment 102. After the headset user 104 is in the position 130A, the headset user 104 can say "scan left" to designate the virtual position indicator 230A. Thus, in this scenario, the virtual position indicator 230A is designated as a left anchor for calibrating the position of the headset user 104. After designating the virtual position indicator 230A, the headset user 104 can walk to the position 130B in the physical environment 102. After the headset user 104 is in the position 130B, the headset user 104 can say "scan right" to designate the virtual position indicator 230B. Thus, in this scenario, the virtual position indicator 230B is designated as a right anchor for calibrating the position of the headset user 104.

After the headset user 104 designates the virtual position indicators 230, the headset user 104 can select whether to display the 3D visual representation 120A of FIG. 2A or the 2D visual representation 120B of FIG. 2B. For example, if the headset user 104 selects a third option 306 from the interface 300 after designating the virtual position indicators 230, the processor 110 can display the 3D visual representation 120A of FIG. 2A at the display screen 118. However, if the headset user 104 selects a fourth option 308 from the interface 300 after designating the virtual position indicators 230, the processor 110 can display the 2D visual representation 120B of FIG. 2B at the display screen 118.

The techniques described with respect to FIG. 3 enable the position of the headset user 104 to be calibrated based on anchors set by the headset user 104 and without scanning markers (e.g., QR codes) at predetermined locations in the aircraft. As a result, the headset user 104 can use any convenient, arbitrary position as a calibration anchor to enable the processor 110 to calibrate the position.

Figure 4:
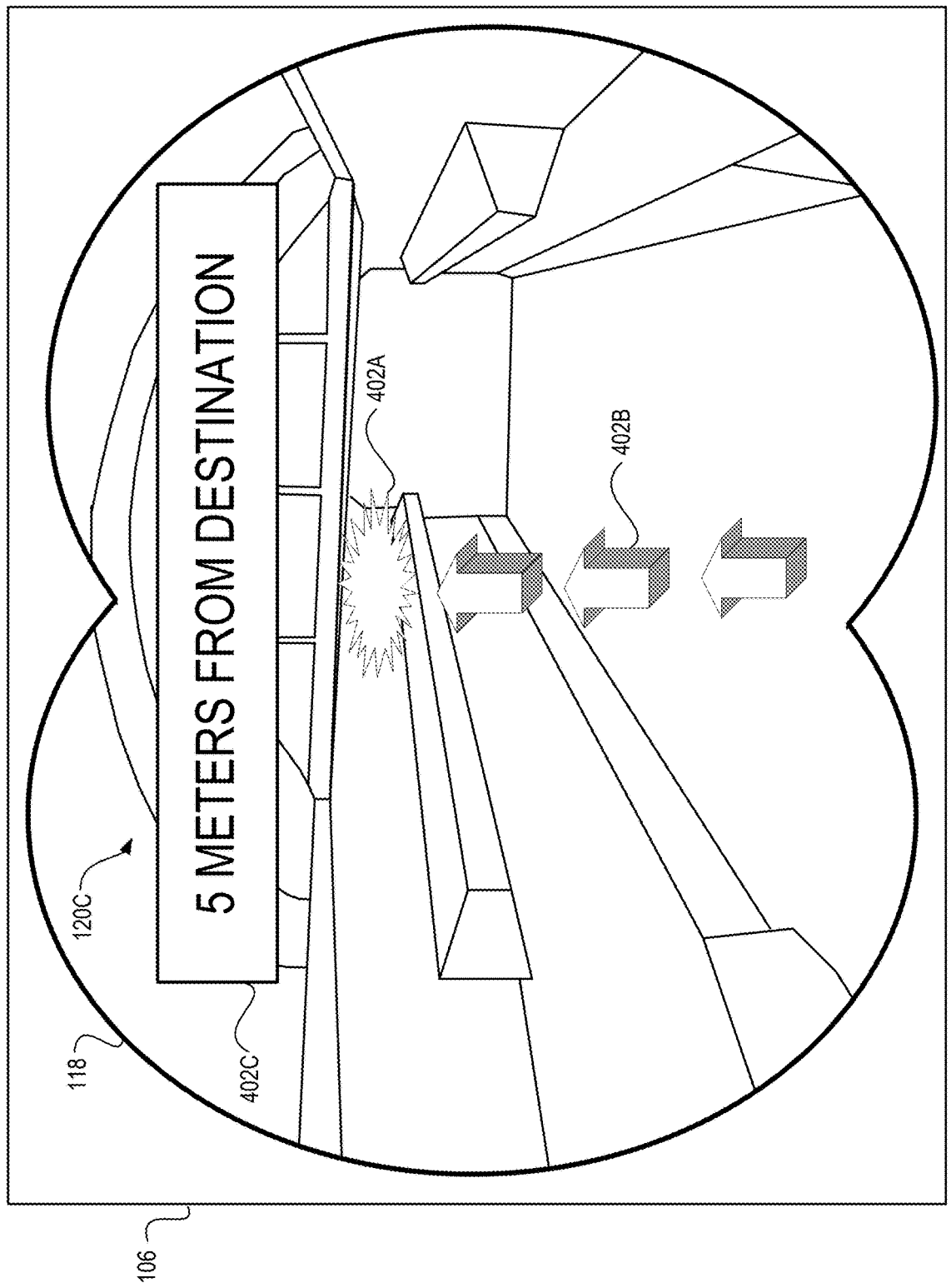
FIG. 4 depicts a three-dimensional visual representation of a physical environment with guidance cues from a remote headset user.

Referring to FIG. 4, a third non-limiting example of the visual representation 120C displayed at the display screen 118 is illustrated. In FIG. 4, the visual representation 120C corresponds to a 3D augmented-reality representation of the physical environment 102. The visual representation 120C is similar to the visual representation 120A of FIG. 2A, however, the visual representation 120C includes virtual guidance cues 402 provided by a remote headset user instead of the avatar 204A of the remote headset user.

For example, the remote headset user can be located in a non-aircraft environment as opposed to being located in an aircraft with a similar layout to the aircraft 100. To illustrate, as a non-limiting example, the remote headset user can be on a computer. In this scenario, once the headset user 104 designates the virtual position indicators 230, the remote headset user can identify the location of the headset user 104 on the aircraft 100 using the computer. To assist the headset user 104 in performing maintenance tasks, from the computer, the remote headset user can insert virtual guidance cues 402 into the visual representation 120C displayed at the display screen 118 of the headset 106. As illustrated in FIG. 4, the remote headset user can insert a first virtual guidance cue 402A indicating a target destination for the headset user 104, a second virtual guidance cue 402B indicating a path for the headset user 104 to follow to the target destination, and a third virtual guidance cue 402C indicating a distance between the headset user 104 and the target destination. It should be understood that the virtual guidance cues 402 are merely for illustrative purposes and should not be construed as limiting. In other implementations, different virtual guidance cues can be inserted by the remote headset user into the visual representation 120C.

The techniques described with respect to FIG. 4 enable a remote subject matter expert to assist a maintenance crew member performing maintenance tasks. For example, from a computer, the remote subject matter expert can insert the virtual guidance cues 402 into the visual representation 120C displayed at the display screen 118 of the headset 106. The maintenance crew member (e.g., the headset user 104) can follow the virtual guidance cues 402 to reach a target destination and can communicate with the remote subject matter expert for assistance in completing the maintenance task.

Figure 5:
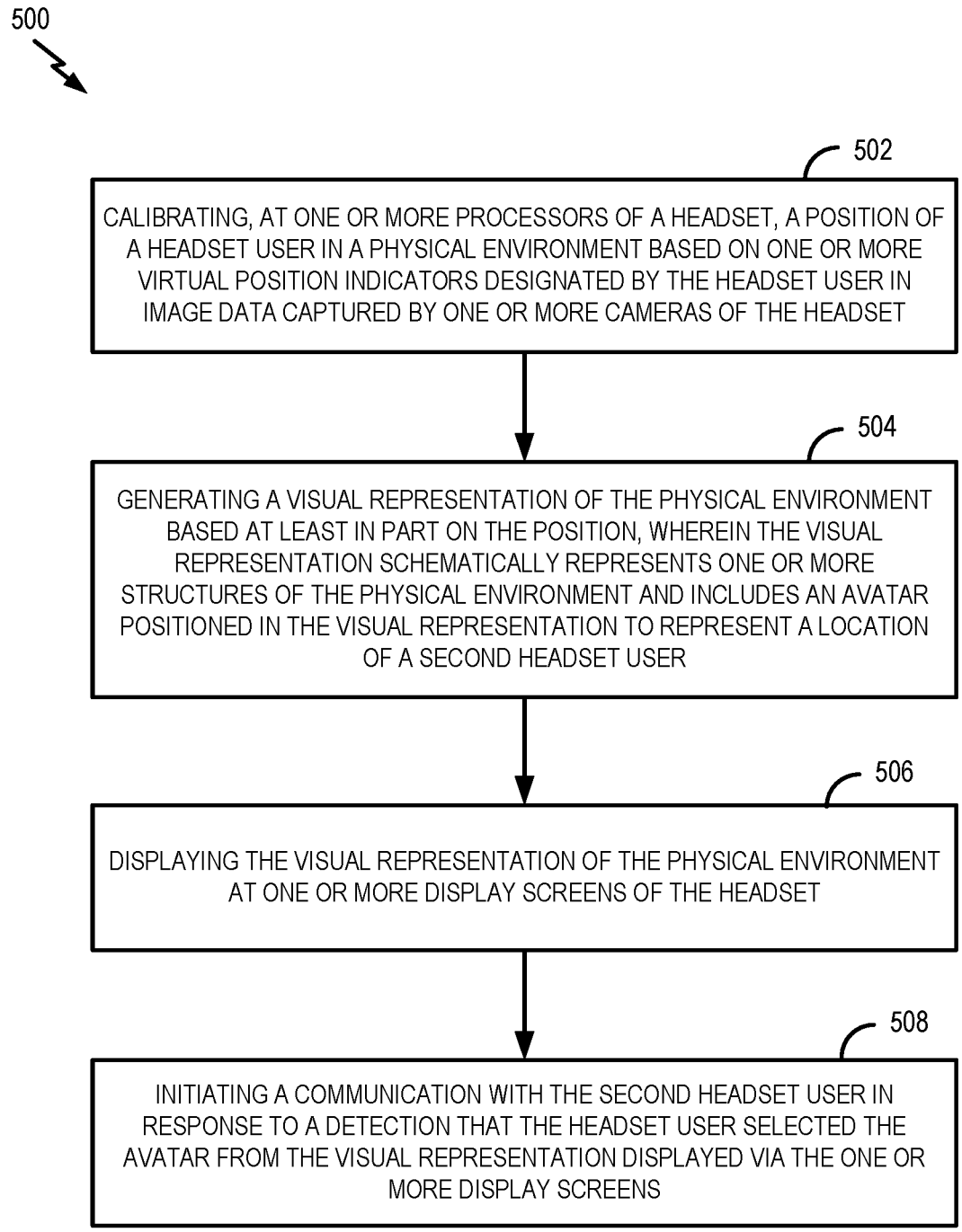
FIG. 5 is a flowchart of an example of a method of providing a user with situational awareness for a surrounding environment.

Referring to FIG. 5, a method of providing a user with situational awareness for a surrounding environment is shown and generally designated method 500. In a particular aspect, one or more operations of the method 500 are performed by the headset 106.

The method 500 includes calibrating, at one or more processors of a headset, a position of a headset user in a physical environment based on one or more virtual position indicators designated by the headset user in image data captured by one or more cameras of the headset, at block 502. For example, the processor 110 can calibrate the position of the headset user 104 in the physical environment 102 based on the virtual position indicators 230 designated by the headset user 104 in the image data 115 captured by the cameras 114.

According to one implementation of the method 500, calibrating the position of the headset user 104 includes receiving a first virtual position indicator 230A designated by the headset user 104 in the image data 115 captured by the one or more cameras 114 while the headset user 104 is at a first position 130a in the physical environment 102. The first virtual position indicator 230A indicates that the headset user 104 is at the first position 130A. Calibrating the position of the headset user 104 can also include tracking movements of the headset user 104 between the first position 130A and a second position 130B in the physical environment 102. Calibrating the position of the headset user 104 can also include receiving a second virtual position indicator 230B designated by the headset user 104 in the image data 115 captured by the one or more cameras 114 while the headset user 104 is at the second position 130B in the physical environment 102. The second virtual position indicator 230B indicates that the headset user 104 is at the second position 130B. The position of the headset user 104 can be calibrated relative to the physical environment 102 based on the first virtual position indicator 230A, the tracked movements, and the second virtual position indicator 230B.

The method 500 also includes generating a visual representation of the physical environment based at least in part on the position, at block 504. The visual representation schematically represents one or more structures of the physical environment and includes an avatar positioned in the visual representation to represent a location of a second headset user. For example, the processor 110 generates the visual representation 120 of the physical environment 102.

The method 500 also includes displaying the visual representation of the physical environment at one or more display screens of the headset, at block 506. For example, the processor 110 displays the visual representation 120 of the physical environment 102 at the display screen 118 of the headset 106.

The method 500 also includes initiating a communication with the second headset user in response to a detection that the headset user selected the avatar from the visual representation displayed via the one or more display screens, at block 508. For example, the processor 110 initiates a communication with a second headset user in response to detecting that the headset user 104 selected the avatar 204 from the visual representation 120.

The method 500 of FIG. 5 enables information associated with other headset users to be integrated into visual representations 120 displayed at the headset 106 of the headset user 104. For example, avatars 204B-204D indicating the location of other headset users in the aircraft 100 can be integrated into the visual representation 120B displayed at the display screen 118. Additionally, the headset user 104 can select a particular avatar 204 to call the corresponding headset user. Additionally, the techniques described herein enable remote headset users to transpose a virtual avatar 204A into the visual representation 120A displayed at the display screen 118 such that it looks as if the remote headset user is in the same physical environment 102 as the headset user 104.

Figure 6:
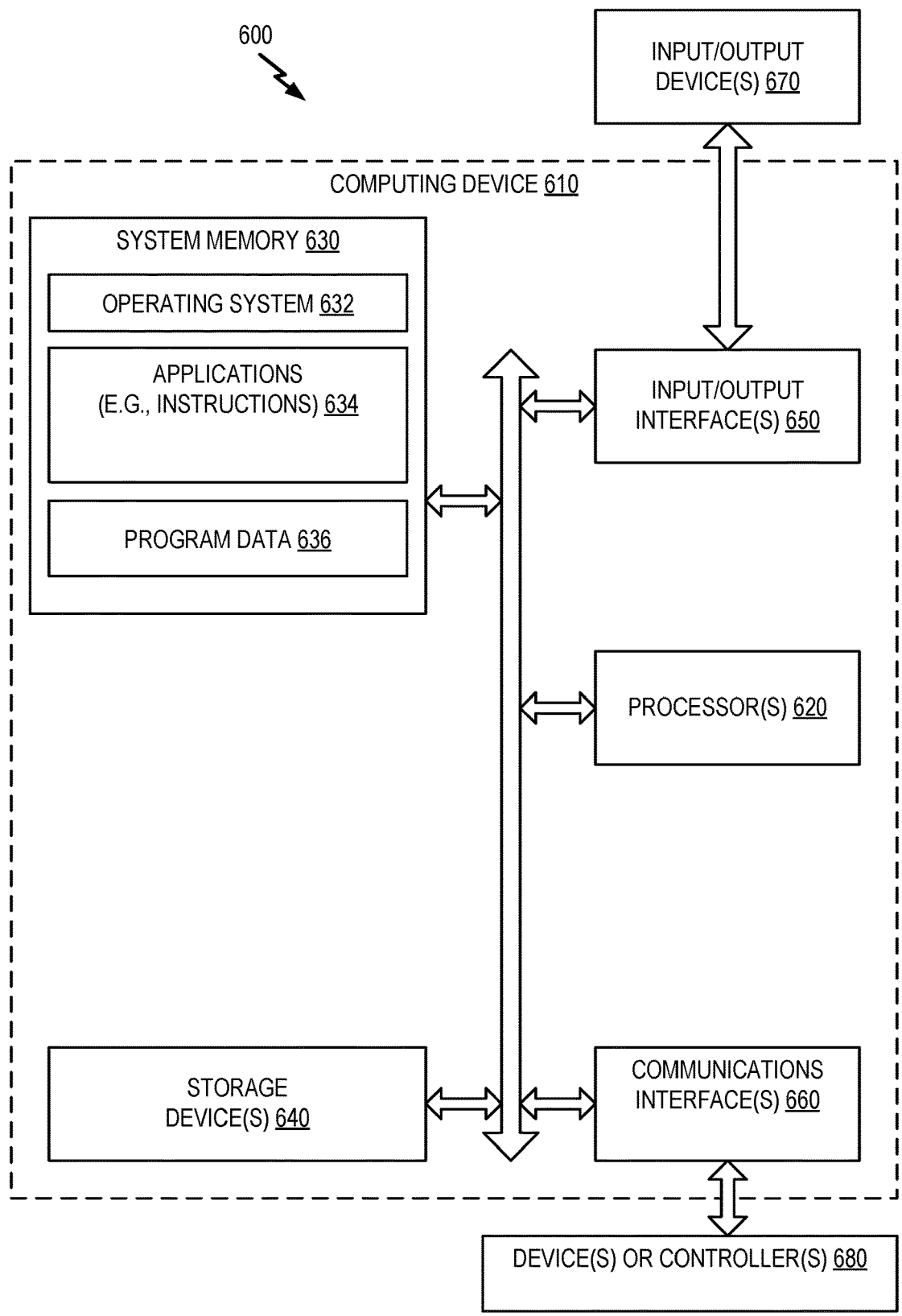
FIG. 6 is a block diagram of a computing environment including a computing device configured to support aspects of computer-implemented methods and computer-executable program instructions (or code) according to the subject disclosure.

FIG. 6 is a block diagram of a computing environment 600 including a computing device 610 configured to support aspects of computer-implemented methods and computer-executable program instructions (or code) according to the subject disclosure. For example, the computing device 610, or portions thereof, is configured to execute instructions to initiate, perform, or control one or more operations described with reference to FIGS. 1-5. According to another implementation, the computing device 610 can correspond to the headset 106.

The computing device 610 includes one or more processors 620. According to one implementation, the one or more processors 620 can correspond to the processor 110 of FIG. 1. According to another implementation, the one or more processors 620 can be distinct from the processor 110 and can communicate with the processor 110 over a network. The processor(s) 620 are configured to communicate with system memory 630, one or more storage devices 640, one or more input/output interfaces 650, one or more communications interfaces 660, or any combination thereof. The system memory 630 includes volatile memory devices (e.g., random access memory (RAM) devices), nonvolatile memory devices (e.g., read-only memory (ROM) devices, programmable read-only memory, and flash memory), or both. The system memory 630 stores an operating system 632, which can include a basic input/output system for booting the computing device 610 as well as a full operating system to enable the computing device 610 to interact with users, other programs, and other devices. According to one implementation, the system memory 630 can correspond to the memory 112 of FIG. 1. For example, the system memory 630 stores system (program) data 636, such as the image data 115, the remote avatar data 150, the local avatar data 152, etc. According to another implementation, the system memory 630 can be distinct from the memory 112 and the system data 636 can be communicated over a network.

The system memory 630 includes one or more applications 634 (e.g., sets of instructions) executable by the processor(s) 620. As an example, the one or more applications 634 include instructions executable by the processor(s) 620 to initiate, control, or perform one or more operations described with reference to FIGS. 1-5. To illustrate, the one or more applications 634 include instructions executable by the processor(s) 620 to initiate, control, or perform one or more operations described with reference to the headset 106.

In a particular implementation, the system memory 630 includes a non-transitory, computer readable medium (e.g., a computer-readable storage device) storing the instructions that, when executed by the processor(s) 620, cause the processor(s) 620 to initiate, perform, or control operations to provide situational awareness to a headset. The operations include calibrating a position (e.g., the position 130) of a headset user (e.g., the headset user 104) in a physical environment (e.g., the physical environment 102) based on one or more virtual position indicators (e.g., the virtual position indicators 230) designated by the headset user in image data (e.g., the image data 115) captured by one or more cameras (e.g., the cameras 114). The operations also include generating a visual representation (e.g., the visual representation 120) of the physical environment based at least in part on the position. The visual representation schematically represents one or more structures (e.g., the structures 140) of the physical environment and includes an avatar (e.g., the avatars 204) positioned in the visual representation to represent a location of a second headset user. The operations also include displaying the visual representation of the physical environment at one or more display screens (e.g., the display screen 118). The operations also include initiating a communication, via communication circuitry (e.g., the communication circuitry 116), with the second headset user in response to a detection that the headset user selected the avatar via the visual representation.

The one or more storage devices 640 include nonvolatile storage devices, such as magnetic disks, optical disks, or flash memory devices. In a particular example, the storage devices 640 include both removable and non-removable memory devices. The storage devices 640 are configured to store an operating system, images of operating systems, applications (e.g., one or more of the applications 634), and program data (e.g., the program data 636). In a particular aspect, the system memory 630, the storage devices 640, or both, include tangible computer-readable media. In a particular aspect, one or more of the storage devices 640 are external to the computing device 610.

The one or more input/output interfaces 650 enable the computing device 610 to communicate with one or more input/output devices 670 to facilitate user interaction. For example, the one or more input/output interfaces 650 can include a display interface, an input interface, or both. For example, the input/output interface 650 is adapted to receive input from a user, to receive input from another computing device, or a combination thereof. In some implementations, the input/output interface 650 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 670 includes one or more user interface devices and displays. The processor(s) 620 are configured to communicate with devices or controllers 680 via the one or more communications interfaces 660.

In some implementations, a non-transitory, computer readable medium stores instructions that, when executed by one or more processors 620, cause the one or more processors 620 to initiate, perform, or control operations to perform part or all of the functionality described above. For example, the instructions can be executable to implement one or more of the operations or methods of FIGS. 1-5. In some implementations, part or all of one or more of the operations or methods of FIGS. 1-5 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following examples:

Example 1

A headset comprising: communication circuitry; one or more cameras; one or more display screens; and one or more processors coupled to the communication circuitry, the one or more display screens, and the one or more cameras and configured to: calibrate a position of a headset user in a physical environment based on one or more virtual position indicators designated by the headset user in image data captured by the one or more cameras; generate a visual representation of the physical environment based at least in part on the position, wherein the visual representation schematically represents one or more structures of the physical environment and includes an avatar positioned in the visual representation to represent a location of a second headset user; display the visual representation of the physical environment at the one or more display screens; and initiate a communication, via the communication circuitry, with the second headset user in response to a detection that the headset user selected the avatar via the visual representation.

Example 2

The headset of Example 1, wherein the physical environment comprises an aircraft.

Example 3

The headset of any of Examples 1 to 2, wherein the visual representation corresponds to a two-dimensional representation of the physical environment.

Example 4

The headset of any of Examples 1 to 3, wherein the visual representation corresponds to a three-dimensional, augmented-reality representation of the physical environment.

Example 5

The headset of any of Examples 1 to 4, wherein the physical environment corresponds to an aircraft, wherein the headset user and the second headset user are located in the aircraft, and wherein the visual representation (120) of the physical environment includes a representation of a layout of the aircraft along with one or more avatars indicative of positions of the headset user and one or more additional headset users relative to the layout of the aircraft.

Example 6

The headset of any of Examples 1 to 5, wherein the physical environment corresponds to a first aircraft, wherein the headset user is located in the first aircraft, and wherein the second headset user is located in a second aircraft that includes similar characteristics as the first aircraft.

Example 7

The headset of any of Examples 1 to 5, wherein the physical environment corresponds to a first aircraft, wherein the headset user is located in the first aircraft, and wherein the second headset user is located in a non-aircraft environment.

Example 8

The headset of any of Examples 1 to 7, wherein the one or more processors are further configured to: receive a first virtual position indicator designated by the headset user in the image data captured by the one or more cameras while the headset user is at a first position in the physical environment, the first virtual position indicator indicating that the headset user is at the first position; track movements of the headset user between the first position and a second position in the physical environment; receive a second virtual position indicator designated by the headset user in the image data captured by the one or more cameras while the headset user is at the second position in the physical environment, the second virtual position indicator indicating that the headset user is at the second position; and calibrate the position of the headset user relative to the physical environment based on the first virtual position indicator, the tracked movements, and the second virtual position indicator.

Example 9

The headset of any of Examples 1 to 8, wherein the visual representation of the physical environment further includes a headset user avatar indicative of the position of the headset user.

Example 10

The headset of any of Examples 1 to 9, wherein the visual representation of the physical environment further includes one or more additional avatars indicative of positions of one or more additional remote users relative to the physical environment.

Example 11

The headset of any of Examples 1 to 10, wherein the position of the headset user is determined without scanning a marker set a predetermined location in the physical environment.

Example 12

A method comprising: calibrating, at one or more processors of a headset, a position of a headset user in a physical environment based on one or more virtual position indicators designated by the headset user in image data captured by one or more cameras of the headset; generating a visual representation of the physical environment based at least in part on the position, wherein the visual representation schematically represents one or more structures of the physical environment and includes an avatar positioned in the visual representation to represent a location of a second headset user; displaying the visual representation of the physical environment at one or more display screens of the headset; and initiating a communication with the second headset user in response to a detection that the headset user selected the avatar from the visual representation displayed via the one or more display screens.

Example 13

The method of Example 12, wherein calibrating the position of the headset user comprises: receiving a first virtual position indicator designated by the headset user in the image data captured by the one or more cameras while the headset user is at a first position in the physical environment, the first virtual position indicator indicating that the headset user is at the first position; tracking movements of the headset user between the first position and a second position in the physical environment; receiving a second virtual position indicator designated by the headset user in the image data captured by the one or more cameras while the headset user is at the second position in the physical environment, the second virtual position indicator indicating that the headset user is at the second position; and calibrating the position of the headset user relative to the physical environment based on the first virtual position indicator, the tracked movements, and the second virtual position indicator.

Example 14

The method of any of Examples 12 to 13, wherein the physical environment comprises an aircraft.

Example 15

The method of any of Examples 12 to 14, wherein the visual representation corresponds to a two-dimensional representation of the physical environment.

Example 16

The method of any of Examples 12 to 15, wherein the visual representation corresponds to a three-dimensional, augmented-reality representation of the physical environment.

Example 17

The method of any of Examples 12 to 16, wherein the second headset user is remote from the physical environment, and wherein the avatar corresponds to a virtual representation of the second headset user that is transposed into the three-dimensional, augmented-reality representation.

Example 18

The method of any of Examples 12 to 17, wherein the physical environment corresponds to a first aircraft, wherein the headset user is located in the first aircraft, and wherein the second headset user is located in a second aircraft that includes similar characteristics as the first aircraft.

Example 19

The method of any of Examples 12 to 17, wherein the physical environment corresponds to a first aircraft, wherein the headset user is located in the first aircraft, and wherein the second headset user is located in a non-aircraft environment.

Example 20

The method of any of Examples 12 to 19, wherein the visual representation of the physical environment further includes a headset user avatar indicative of the position of the headset user.

Example 21

The method of any of Examples 12 to 20, wherein the visual representation of the physical environment further includes one or more additional avatars indicative of positions of one or more additional remote users relative to the physical environment.

Example 22

The method of any of Examples 12 to 21, wherein the position of the headset user is determined without scanning a marker set a predetermined location in the physical environment.

Example 23

A non-transitory computer-readable medium comprising instructions that, when executed by one or more processors of a headset, cause the one or more processors to: calibrate a position of a headset user in a physical environment based on one or more virtual position indicators designated by the headset user in image data captured by one or more cameras; generate a visual representation of the physical environment based at least in part on the position, wherein the visual representation schematically represents one or more structures of the physical environment and includes an avatar positioned in the visual representation to represent a location of a second headset user; display the visual representation of the physical environment at one or more display screens; and initiate a communication, via communication circuitry, with the second headset user in response to a detection that the headset user selected the avatar via the visual representation.

Example 24

The non-transitory computer-readable medium of Example 23, wherein the physical environment comprises an aircraft.

Example 25

The non-transitory computer-readable medium of any of Examples 23 to 24, wherein the visual representation corresponds to a two-dimensional representation of the physical environment.

Example 26

The non-transitory computer-readable medium of any of Examples 23 to 25, wherein the visual representation corresponds to a three-dimensional, augmented-reality representation of the physical environment.

Example 27

The non-transitory computer-readable medium of any of Examples 23 to 26, wherein the second headset user is remote from the physical environment, and wherein the avatar corresponds to a virtual representation of the second headset user that is transposed into the three-dimensional, augmented-reality representation.

Example 28

The non-transitory computer-readable medium of any of Examples 23 to 27, wherein the physical environment corresponds to a first aircraft, wherein the headset user is located in the first aircraft, and wherein the second headset user is located in a second aircraft that includes similar characteristics as the first aircraft.

Example 29

The non-transitory computer-readable medium of any of Examples 23 to 28, wherein the physical environment corresponds to a first aircraft, wherein the headset user is located in the first aircraft, and wherein the second headset user is located in a non-aircraft environment.

Example 30

The non-transitory computer-readable medium of any of Examples 23 to 29, wherein the instructions are further executable to cause the one or more processors to: receive a first virtual position indicator designated by the headset user in the image data captured by the one or more cameras while the headset user is at a first position in the physical environment, the first virtual position indicator indicating that the headset user is at the first position; track movements of the headset user between the first position and a second position in the physical environment; receive a second virtual position indicator designated by the headset user in the image data captured by the one or more cameras while the headset user is at the second position in the physical environment, the second virtual position indicator indicating that the headset user is at the second position; and calibrate the position of the headset user relative to the physical environment based on the first virtual position indicator, the tracked movements, and the second virtual position indicator.

Example 31

The non-transitory computer-readable medium of any of Examples 23 to 30, wherein the visual representation of the physical environment further includes a headset user avatar indicative of the position of the headset user.

Example 32

The non-transitory computer-readable medium of any of Examples 23 to 31, wherein the visual representation of the physical environment further includes one or more additional avatars indicative of positions of one or more additional remote users relative to the physical environment.

Example 33

The non-transitory computer-readable medium of any of Examples 23 to 32, wherein the position of the headset user is determined without scanning a marker set a predetermined location in the physical environment.

What is claimed is:

1. A headset comprising:
   communication circuitry;
   one or more cameras;
   one or more display screens; and
   one or more processors coupled to the communication circuitry, the one or more display screens, and the one or more cameras and configured to:
     calibrate a position of a headset user in a physical environment based on one or more virtual position indicators designated by the headset user in image data captured by the one or more cameras, wherein the virtual position indicators correspond to user selected locations in a two-dimensional schematic of the physical environment, and wherein the position is calibrated based on sensor data identifying movement between a first virtual position indicator and a second virtual position indicator;
     receive positional data from a second headset of a second headset user, wherein the positional data is calibrated to identify a second user position relative to the physical environment;
     generate a visual representation of the physical environment based at least in part on the position, wherein the visual representation represents one or more structures of the physical environment and includes an avatar positioned to represent a location of the second headset user, wherein the visual representation is generated based on the two-dimensional schematic, the virtual position indicators, the positional data, and the sensor data, and wherein the visual representation comprises a two-dimensional representation of the physical environment or a three-dimensional representation of the physical environment;
     display the visual representation of the physical environment at the one or more display screens; and
     initiate a communication, via the communication circuitry, with the second headset user in response to a detection that the headset user selected the avatar via the visual representation.

2. The headset of claim 1, wherein the physical environment comprises an aircraft, wherein the second headset user is located in a second physical environment that comprises a second aircraft, and wherein the two-dimensional schematic corresponds to a first floorplan of the aircraft and a second floorplan of the second aircraft.

3. The headset of claim 1, wherein the visual representation corresponds to the two-dimensional representation of the physical environment.

4. The headset of claim 1, wherein the visual representation corresponds to the three-dimensional representation of the physical environment, and wherein the three-dimensional representation includes augmented reality.

5. The headset of claim 1, wherein the physical environment corresponds to an aircraft, wherein the headset user and the second headset user are located in the aircraft and the headset user is about to turn on an engine, wherein the visual representation of the physical environment includes a representation of a layout of the aircraft along with one or more avatars indicative of positions of the headset user and one or more additional headset users relative to the layout of the aircraft, and wherein the initiation of the communication via the communication circuitry with the second headset user within the same physical environment who is at a location proximate the engine provides instruction to the second headset user proximate the engine to move to a safe place and ensures that proper safety precautions are undertaken.

6. The headset of claim 1, wherein the physical environment corresponds to a first aircraft, wherein the headset user is located in the first aircraft, and wherein the second headset user is located in a second aircraft that includes similar characteristics as the first aircraft.

7. The headset of claim 1, wherein the physical environment corresponds to a first aircraft, wherein the headset user is located in the first aircraft, and wherein the second headset user is located in a non-aircraft environment.

8. The headset of claim 1, wherein the one or more processors are further configured to:
  receive a first virtual position indicator designated by the headset user in the image data captured by the one or more cameras while the headset user is at a first position in the physical environment, the first virtual position indicator indicating that the headset user is at the first position;
  track movements of the headset user between the first position and a second position in the physical environment;
  receive a second virtual position indicator designated by the headset user in the image data captured by the one or more cameras while the headset user is at the second position in the physical environment, the second virtual position indicator indicating that the headset user is at the second position; and
  calibrate the position of the headset user relative to the physical environment based on the first virtual position indicator, the tracked movements, and the second virtual position indicator.

9. The headset of claim 1, wherein the visual representation of the physical environment further includes a headset user avatar indicative of the position of the headset user.

10. The headset of claim 1, wherein the visual representation of the physical environment further includes one or more additional avatars indicative of positions of one or more additional remote users relative to the physical environment.

11. The headset of claim 1, wherein the position of the headset user is determined without scanning a marker set a predetermined location in the physical environment.

12. A method comprising:
  calibrating, at one or more processors of a headset, a position of a headset user in a physical environment based on one or more virtual position indicators designated by the headset user in image data captured by one or more cameras of the headset, wherein the virtual position indicators correspond to user selected locations in a two-dimensional schematic of the physical environment, and wherein the position is calibrated based on sensor data identifying movement between a first virtual position indicator and a second virtual position indicator;
  receiving positional data from a second headset of a second headset user, wherein the positional data is calibrated to identify a second user position relative to the physical environment;
  generating a visual representation of the physical environment based at least in part on the position, wherein the visual representation represents one or more structures of the physical environment and includes an avatar positioned to represent a location of the second headset user, wherein the visual representation is generated based on the two-dimensional schematic, the virtual position indicators, the positional data, and the sensor data, and wherein the visual representation comprises a two-dimensional representation of the physical environment or a three-dimensional representation of the physical environment;
  displaying the visual representation of the physical environment at one or more display screens of the headset; and
  initiating a communication with the second headset user in response to a detection that the headset user selected the avatar from the visual representation displayed via the one or more display screens.

13. The method of claim 12, wherein calibrating the position of the headset user comprises:
  receiving a first virtual position indicator designated by the headset user in the image data captured by the one or more cameras while the headset user is at a first position in the physical environment, the first virtual position indicator indicating that the headset user is at the first position;
  tracking movements of the headset user between the first position and a second position in the physical environment;
  receiving a second virtual position indicator designated by the headset user in the image data captured by the one or more cameras while the headset user is at the second position in the physical environment, the second virtual position indicator indicating that the headset user is at the second position; and
  calibrating the position of the headset user relative to the physical environment based on the first virtual position indicator, the movements, and the second virtual position indicator.

14. The method of claim 12, wherein the physical environment comprises an aircraft.

15. The method of claim 12, wherein the visual representation corresponds to the two-dimensional representation of the physical environment.

16. The method of claim 12, wherein the visual representation corresponds to the three-dimensional representation of the physical environment.

17. The method of claim 16, wherein the second headset user is remote from the physical environment, and wherein the avatar corresponds to a virtual representation of the second headset user that is transposed into the three-dimensional representation.

18. A non-transitory computer-readable medium comprising instructions that, when executed by one or more processors of a headset, cause the one or more processors to:
  calibrate a position of a headset user in a physical environment based on one or more virtual position indicators designated by the headset user in image data captured by one or more cameras, wherein the virtual position indicators correspond to user selected locations in a two-dimensional schematic of the physical environment, and wherein the position is calibrated based on sensor data identifying movement between a first virtual position indicator and a second virtual position indicator;

receive positional data from a second headset of a second headset user, wherein the positional data is calibrated to identify a second user position relative to the physical environment;

generate a visual representation of the physical environment based at least in part on the position, wherein the visual representation represents one or more structures of the physical environment and includes an avatar positioned to represent a location of the second headset user, wherein the visual representation is generated based on the two-dimensional schematic, the virtual position indicators, the positional data, and the sensor data, and wherein the visual representation comprises a two-dimensional representation of the physical environment or a three-dimensional representation of the physical environment;

display the visual representation of the physical environment at one or more display screens; and initiate a communication, via communication circuitry, with the second headset user in response to a detection that the headset user selected the avatar via the visual representation.

19. The non-transitory computer-readable medium of claim 18, wherein the physical environment comprises an aircraft.

20. The non-transitory computer-readable medium of claim 18, wherein the visual representation of the physical environment further includes one or more additional avatars indicative of positions of one or more additional remote users relative to the physical environment.

* * * * *